US011643291B2

(12) United States Patent
Nakamura et al.

(10) Patent No.: US 11,643,291 B2
(45) Date of Patent: May 9, 2023

(54) SHEET CONVEYANCE DEVICE AND METHOD

(71) Applicant: TOSHIBA TEC KABUSHIKI KAISHA, Tokyo (JP)

(72) Inventors: Koki Nakamura, Sunto Shizuoka (JP); Takashi Tomiyama, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 46 days.

(21) Appl. No.: 17/393,044

(22) Filed: Aug. 3, 2021

(65) Prior Publication Data

US 2022/0194726 A1 Jun. 23, 2022

(30) Foreign Application Priority Data

Dec. 21, 2020 (JP) .............................. JP2020-211123

(51) Int. Cl.
*B65H 7/02* (2006.01)
*H04N 1/00* (2006.01)
*G06K 7/00* (2006.01)
*B65H 5/06* (2006.01)
*H04N 1/32* (2006.01)

(52) U.S. Cl.
CPC ................ *B65H 7/02* (2013.01); *B65H 5/06* (2013.01); *G06K 7/00* (2013.01); *H04N 1/00342* (2013.01); *H04N 1/32138* (2013.01)

(58) Field of Classification Search
CPC ............ B65H 2553/52; B65H 2557/61; B65H 2557/63; B65H 2801/06; B65H 5/06; B65H 7/02; G06K 7/00; H04N 1/00342; H04N 1/32138

USPC .......................................................... 358/498
See application file for complete search history.

(56) References Cited

U.S. PATENT DOCUMENTS

| 10,083,330 | B2* | 9/2018 | Horst | G06K 7/10198 |
| 11,232,338 | B2* | 1/2022 | Tomiyama | G06K 19/0712 |
| 11,457,119 | B2* | 9/2022 | Nakayama | G06K 7/10336 |
| 11,465,867 | B2* | 10/2022 | Ogasahara | G03G 15/5029 |
| 2002/0170973 | A1* | 11/2002 | Teraura | G06K 19/0723 |
| | | | | 235/492 |

(Continued)

FOREIGN PATENT DOCUMENTS

| JP | 2011-129038 A | 6/2011 |
| JP | 2015-46097 A | 3/2015 |

*Primary Examiner* — Negussie Worku
(74) *Attorney, Agent, or Firm* — Kim & Stewart LLP (57) ABSTRACT

A sheet conveyance device includes a roller by which a sheet having a wireless tag is conveyed along a path, a communication device configured to transmit a radio signal to the wireless tag and receive a response signal therefrom, and a processor configured to repeatedly perform a process of controlling the roller to convey a sheet along the path while controlling the communication device to transmit the radio signal to a wireless tag of the sheet using a transmission power that is different in each repeat, and acquire a strength of the response signal from the wireless tag, and specify a minimum strength of the response signal that has been acquired in the repeated process, the minimum strength being equal to or greater than a threshold, and set a transmission power that has been used when the minimum strength has been acquired as a reference strength of the radio signal.

20 Claims, 9 Drawing Sheets

(56) References Cited

U.S. PATENT DOCUMENTS

| | | | |
|---|---|---|---|
| 2007/0126558 A1* | 6/2007 | Donato | G06K 7/0008 |
| | | | 455/63.1 |
| 2008/0239406 A1* | 10/2008 | Nakano | H04N 1/00832 |
| | | | 358/401 |
| 2013/0043983 A1* | 2/2013 | Lee | G06K 1/18 |
| | | | 340/10.51 |
| 2018/0165487 A1* | 6/2018 | Hori | G06K 15/028 |
| 2022/0147295 A1* | 5/2022 | Nakamura | G06K 7/0008 |
| 2022/0194726 A1* | 6/2022 | Nakamura | B65H 5/06 |
| 2022/0283766 A1* | 9/2022 | Koike | B65H 7/20 |

* cited by examiner

SHEET CONVEYANCE DEVICE AND METHOD

CROSS-REFERENCE TO RELATED APPLICATION

This application is based upon and claims the benefit of priority from Japanese Patent Application No. 2020-211123, filed Dec. 21, 2020, the entire contents of which are incorporated herein by reference.

FIELD

Embodiments described herein relate generally to a sheet conveyance device and calibration of sheet conveyance devices.

BACKGROUND

In the related art, printers or multifunctional peripherals (MFP) include an image forming apparatus for forming images on sheets. Such an image forming apparatus includes a conveyance device configured to convey the sheets stored in sheet feeding cassettes or trays. Various types of sheets are used for forming images. For example, some image forming apparatuses can form an image on a sheet that include an embedded wireless tag while writing information to the wireless tag. For example, information is written to a wireless tag by a wireless tag reader/writer during the conveyance of the sheet by the sheet conveyance device.

However, depending on strength of wireless signals, writing to a wireless tag may not be appropriately performed in some cases. For example, if the signal strength is too low, information may not be written to a targeted wireless tag. On the other hand, if the strength is too high, information may be written to non-targeted wireless tags attached to the sheets stored in the sheet feeding cassette or tray.

DETAILED DESCRIPTION

In general, embodiments provide a sheet conveyance device and a method for appropriately writing information to a wireless tag attached to a sheet.

According to one embodiment, a sheet conveyance device includes a conveyance roller by which a sheet having a wireless tag is conveyed along a conveyance path, a communication device configured to transmit a radio signal to the wireless tag and receive a response signal therefrom, and a processor. The processor is configured to repeatedly perform a process of controlling the roller to convey a sheet along the conveyance path while controlling the communication device to transmit the radio signal to a wireless tag of the sheet using a transmission power that is different in each repeat, and acquire a strength of the response signal from the wireless tag. The processor is further configured to specify a minimum strength of the response signal that has been acquired in the repeated process, the minimum strength being equal to or greater than a threshold, and set a transmission power that has been used when the minimum strength has been acquired as a reference strength of the radio signal.

First Embodiment

A sheet conveyance device 40 according to a first embodiment can appropriately write information to a wireless tag since an output strength of a wireless signal for writing can be set to an optimum output strength. Hereinafter, an image forming apparatus 10 including the sheet conveyance device 40 will be described. In the following description, the same reference numerals are given to configurations that have the same or similar functions.

Figure 1:
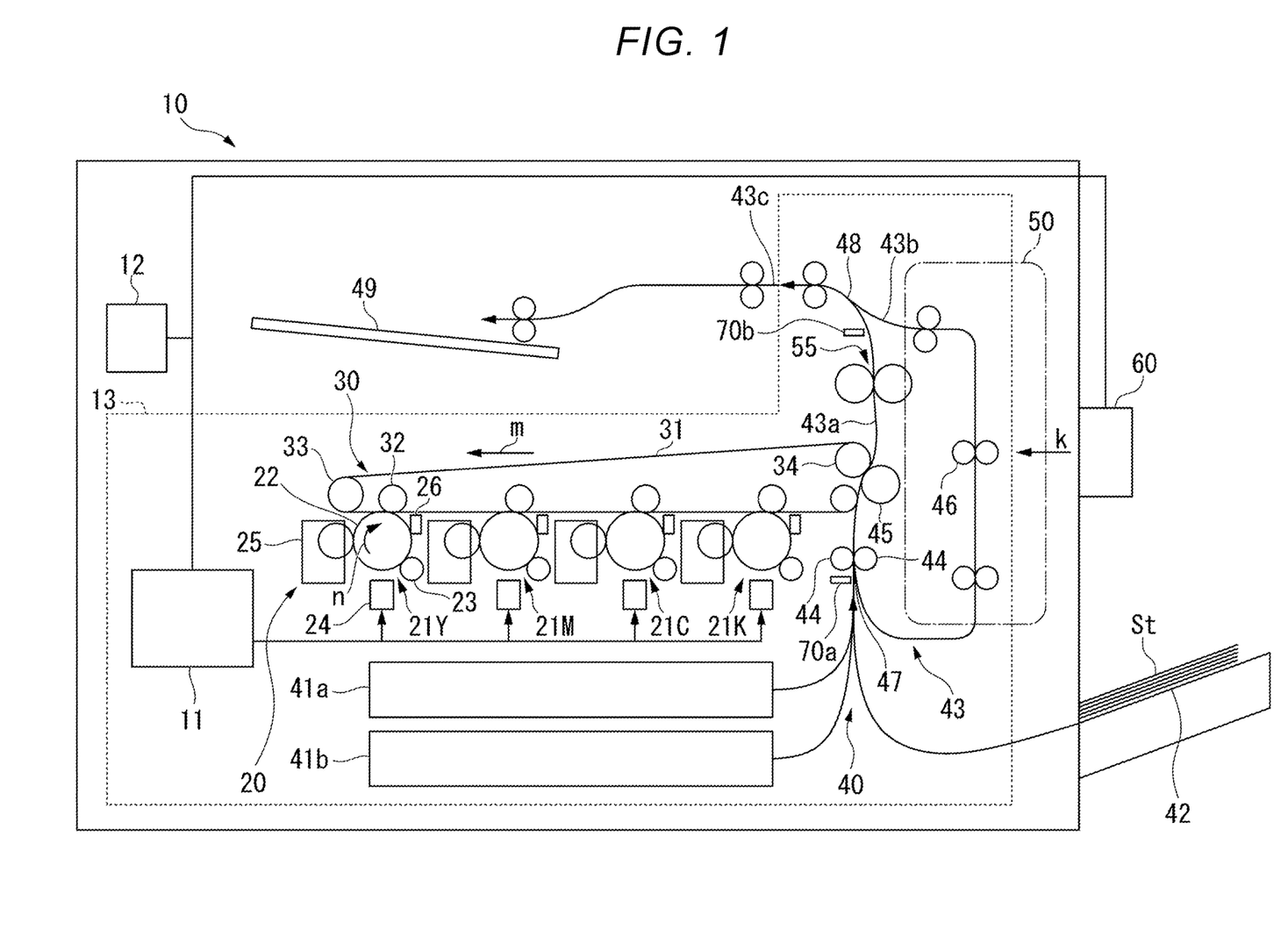
FIG. 1 is a schematic diagram of an image forming apparatus according to a first embodiment.

First, a configuration of the image forming apparatus 10 will be described with reference to FIG. 1. In FIG. 1, the image forming apparatus 10 includes an image forming control unit 11, a control panel 12, and a printer unit 13.

The image forming control unit 11 controls the control panel 12 and the printer unit 13. For example, the image forming control unit 11 controls the printer unit 13 according to instructions input via the control panel 12 such that the printer unit 13 forms an image on a sheet St. For example, the image forming control unit 11 controls conveyance of the sheet St in the printer unit 13. The control of the conveyance of the sheet St includes control of a conveyance timing of the sheet St, a stop position of the sheet St, a conveyance speed of the sheet St, or the like.

The control panel 12 includes at least an input key and a display unit. The input key receives an input operation from the user. For example, the display unit is of a touch panel type. The display unit displays various buttons or the like and receives an input operation from the user. Specifically, the display unit of the control panel 12 displays various settings related to operations of the image forming apparatus 10 and notifies the image forming control unit 11 of the settings selected through an input operation by the user.

The printer unit 13 forms an image on the sheet St according to image data. The image data is acquired from an external device (for example, a personal computer (PC) or a scanner). In an embodiment, toner is fixed on the sheet St to form an image, but an exemplary embodiment is not limited thereto. Ink may be used to form an image on the sheet St. In an embodiment, a secondary transfer scheme in which an image is transferred via an intermediate transfer belt 31 is used, but other schemes that do not require the intermediate transfer belt 31 may also be used. In an embodiment, the image forming apparatus 10 can generate a color image and can also generate a monochromic image. In an embodiment, toner of four colors is used, but toner of three or less colors or toner of five or more colors may also be used.

The printer unit 13 includes an image forming unit 20 and the sheet conveyance device 40. The image forming unit 20 includes image forming units 21Y, 21M, 21C, and 21K and an intermediate transfer unit 30. The image forming units 21Y, 21M, 21C, and 21K correspond to different colors. Specifically, the image forming units 21Y, 21M, 21C, and 21K correspond to Y (yellow), M (magenta), C (cyan), and K (black), respectively. The image forming units 21Y, 21M, 21C, and 21K form different color images and have similar configurations. In the following description, the image forming units 21Y, 21M, 21C, and 21K will be described as the "image forming units 21" unless one of the units for a particular color is being particularly described.

The image forming unit 21 includes a photosensitive drum 22, a charging unit 23, an exposing unit 24, a developing unit 25, and a photoreceptor cleaner 26. The photosensitive drum 22 is rotated in an N direction indicated by an arrow. The charging unit 23 uniformly charges the photosensitive drum 22. The exposing unit 24 exposes the uniformly charged photosensitive drum 22 and forms an electrostatic latent image on the photosensitive drum 22. The developing unit 25 forms the electrostatic latent image on the photosensitive drum 22 using developer. As the developer, for example, two-component developer including toner and carrier is used.

The intermediate transfer unit 30 includes the intermediate transfer belt 31 and a primary transfer roller 32. The intermediate transfer belt 31 is supported by a driven roller 33, a backup roller 34, or the like and is rotated in an m direction indicated by an arrow. The primary transfer roller 32 is disposed to face the photosensitive drum 22 with the intermediate transfer belt 31 interposed therebetween.

The primary transfer roller 32 transfers a toner image that has been formed on the photosensitive drum 22 to the intermediate transfer belt 31. That is, the toner image formed by the image forming unit 21 is first transferred (a primary transfer) to the intermediate transfer belt 31. For each color of Y, M, C, and K, the corresponding toner image is transferred to the intermediate transfer belt 31. Thus, a full color toner image is thus formed on the intermediate transfer belt 31. The photoreceptor cleaner 26 removes the toner remaining on the photosensitive drum 22 after the primary transfer.

The sheet conveyance device 40 includes feeding cassettes 41 (41a and 41b), a feeding tray 42, a conveyance path 43, a discharging tray 49, a fixing unit 55, a wireless tag communication device 60, and sensors 70. The feeding cassettes 41 store the sheets St. The sheets St are put on the feeding tray 42. Along the conveyance path 43, registration rollers 44, a secondary transfer roller 45, and conveyance rollers 46 are arranged.

The registration rollers 44 temporarily stop the sheet St picked up from the feeding cassette 41 or the feeding tray 42. At this time, the tip of the sheet St can abut on the registration rollers 44 and an angle of the sheet St is corrected. The registration rollers 44 transfers the sheet St to the secondary transfer roller 45 at a timing corresponding to that at which the toner image formed on the intermediate transfer belt 31 can be transferred (a secondary transfer) to the sheet St.

The secondary transfer roller 45 is disposed to face the backup roller 34 with the intermediate transfer belt 31 interposed therebetween. The secondary transfer roller 45 transfers the color toner image from the intermediate transfer belt 31 to the sheet St.

The fixing unit 55 fixes the transferred toner image on the sheet St. The fixing unit 55 includes a heating roller and a counter roller disposed to face the heating roller. The sheet St passes through a nip region formed by these rollers. Thus, the toner image is heated and pressed to be fixed to the sheet St.

The conveyance path 43 is a path along which the sheet St is conveyed by a plurality of conveyance rollers (for example, the conveyance rollers 46 or the like). The conveyance path 43 includes an image forming path 43a, a returning path 43b, and a discharging path 43c. The image forming path 43a is a path from a joining portion 47 to a branching portion 48 and is specifically a path passing the secondary transfer roller 45 and the fixing unit 55. The returning path 43b is a path passing inside a duplex printer 50 and is a path along which the sheet St is returned from the branching portion 48 to the joining portion 47. The discharging path 43c is a conveyance path from the branching portion 48 to the discharging tray 49.

In single-sided printing, the sheet St passes through the image forming path 43a, then through the discharging path 43c, and is discharged to the discharging tray 49. In duplex (double-sided) printing, the sheet St passes through the image forming path 43a so that an image can be formed on one surface (for example, a front surface), then passes through the branching portion 48, and is subsequently switched back and conveyed to the returning path 43b. The once-printed sheet St is returned to the joining portion 47, passes through the image forming path 43a so that an image can be formed on the other surface (for example, a rear surface). The now twice-printed sheet St passes through the discharging path 43c, and is discharged to the discharging tray 49.

In the following description, a wireless tag is assumed to be provided in or on each sheet St unless otherwise mentioned. The wireless tag is, for example, a radio frequency identifier (RFID) tag. As a sheet St on which the wireless tag is provided, the sheet St may be made of paper, a plastic film, or the like is used.

The wireless tag communication device 60 transmits radio waves in a direction k indicated by an arrow. The wireless tag communication device 60 communicates with the wireless tag provided on the sheet St passing along the image forming path 43a via an antenna 209 (see FIG. 2). Specifically, the wireless tag communication device 60 can read information from the wireless tag and write information to the wireless tag.

The information written to the wireless tag indicates a destination or the content of an image printed on the sheet St, for example, if each sheet St is to be distributed to different destinations. In an embodiment, the 900 MHz frequency band (UHF) is used for the wireless tag communication device 60 to transmit radio waves to the wireless tag. However, the frequency band is not limited thereto and another frequency band may be used.

The sensors 70 (70a and 70b) detect the sheet St passing along the image forming path 43a. Specifically, the first sensor 70a detects the sheet St entering the registration roller 44. The second sensor 70b detects the sheet St passing through the fixing unit 55. The image forming apparatus 10 can specify a position of the sheet St based on an output from the sensor 70. Specifically, the image forming apparatus 10 can determine that the sheet St is passing along the image forming path 43a from when the first sensor 70 detects the sheet St to when the second sensor 70b detects the sheet St.

Next, a hardware configuration of the image forming apparatus 10 will be described.

Figure 2:
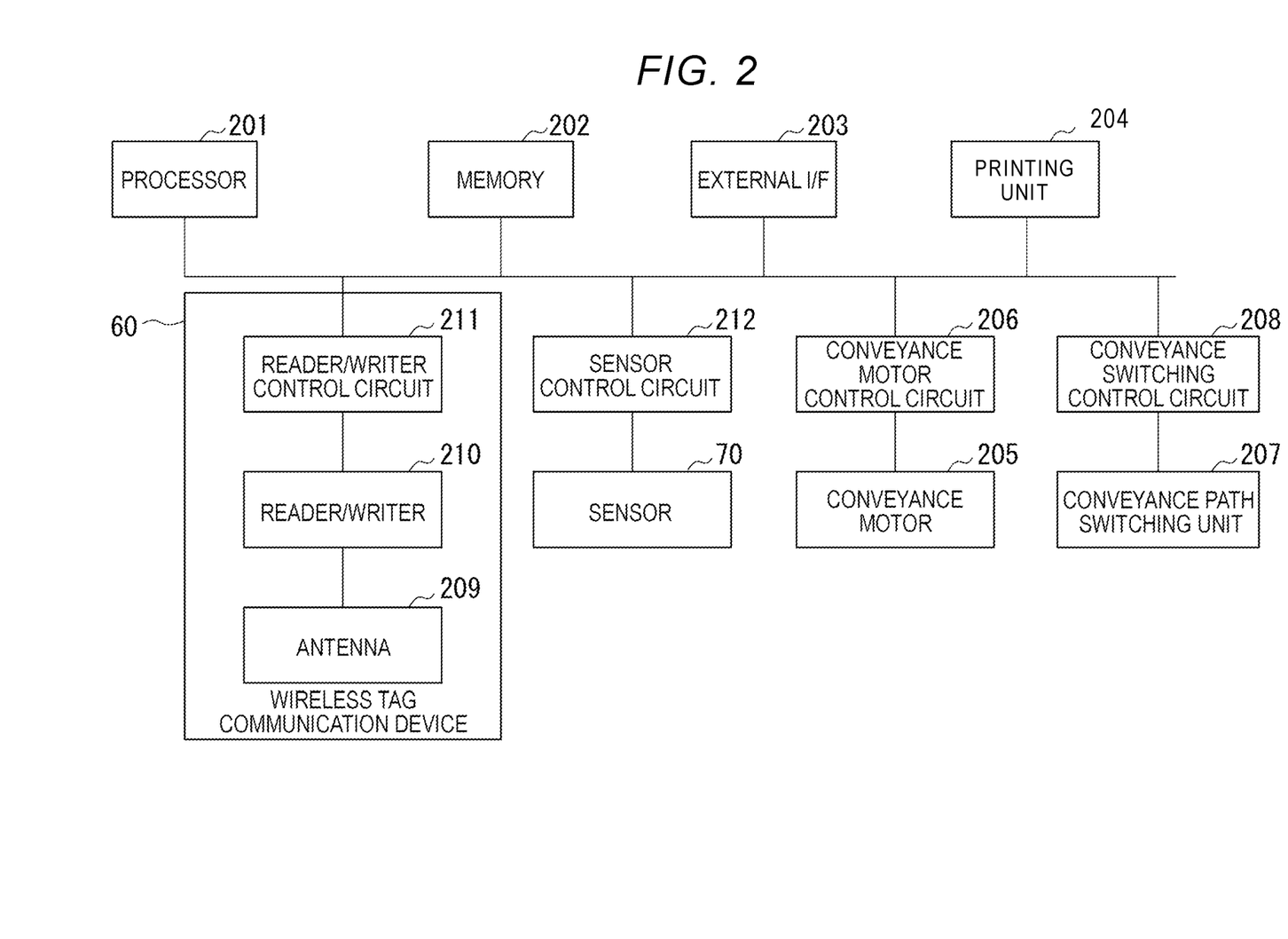
FIG. 2 is a hardware block diagram of an image forming apparatus.

FIG. 2 is a hardware block diagram of the image forming apparatus 10. As illustrated in FIG. 2, the image forming apparatus 10 includes a processor 201, a memory 202, an external interface (I/F) 203, a printing unit 204, a conveyance motor 205, a conveyance motor control circuit 206, a conveyance path switching unit 207, a conveyance switching control circuit 208, an antenna 209, a reader/writer 210, a reader/writer control circuit 211, a sensor control circuit 212, and the sensors 70 (70a and 70b).

The processor 201 controls the entire operations of the image forming apparatus 10. The memory 202 includes a read-only memory (ROM), a random access memory (RAM), and a flash ROM. Specifically, in this example, the flash ROM or the ROM stores various programs such as a sheet conveyance program. The RAM is used as a work area for the processor 201. The processor 201 performs a coded process according to a program loaded onto the memory. In one embodiment, the image forming control unit 11 illustrated in FIG. 1 is implemented by the processor 201. That is, the processor 201 executes various programs to perform the functions of the image forming control unit 11.

In an embodiment, the processor 201 performs various processes by executing programs, but an exemplary embodiment is not limited thereto. For example, various processes can be performed using hardware such as a large scale integration (LSI), an application specific integrated circuit (ASIC), a field-programmable gate array (FPGA), or a graphics processing unit (GPU). Various processes can also be performed in cooperation of software and hardware.

Programs may be stored in advance in a storage device (a storage device including a non-transitory storage medium) such as a hard disk drive (HDD) or a flash memory. The programs may be copied from a storage medium (e.g., a non-transitory storage medium) such as a DVD or a CD-ROM to the storage device when installed.

The external I/F 203 includes, for example, a communication I/F. The external I/F 203 is connected to a network via a communication line and is connected to a server, a PC, or the like via the network. The external I/F 203 controls data communications with another device. For example, a modem, a local area network (LAN) adapter, or the like can be adopted as the external I/F 203. The network is, for example, a LAN, a wide ware network (WAN), or the Internet.

The printing unit 204 performs the functions of transferring an image formed by the image forming unit 20 to the sheet St and discharging the sheet St to the discharging tray 49.

Next, the units 205 to 211 will be described. These units 205 to 211 and the sensors 70 are used to adjust an output strength of a radio wave for writing information to a wireless tag.

The conveyance motor 205 is a driving motor that drives the registration rollers 44, the conveyance rollers 46, and the like when the output strength is adjusted. The conveyance motor control circuit 206 controls driving of the conveyance motor 205 in adjustment of the output strength. The conveyance path switching unit 207 switches the conveyance path of the sheet St in adjustment of the output strength. The conveyance switching control circuit 208 controls the switching of the conveyance path switching unit 207 in adjustment of the output strength.

The antenna 209, the reader/writer 210, and the reader/writer control circuit 211 are included in the wireless tag communication device 60. The antenna 209 transmits a signal to a wireless tag and receives a reflected wave from the wireless tag. The reader/writer 210 reads information from the wireless tag and writes information to the wireless tag. For example, the reader/writer control circuit 211 controls the reader/writer 210. For example, the reader/writer control circuit 211 controls the output strength of a signal output from the antenna 209. The sensor control circuit 212 specifies a position of the sheet St based on an output from each of the sensors 70 (70a and 70b).

Each control circuit (i.e., the conveyance motor control circuit 206, the conveyance switching control circuit 208, the reader/writer control circuit 211, and the sensor control circuit 212) may be an LSI, an ASIC, and an FPGA. Alternatively, some or all of the functions of these control circuits may be performed by a CPU according to one or more programs.

Next, an operation of the sheet St in duplex printing will be described.

Figure 3:
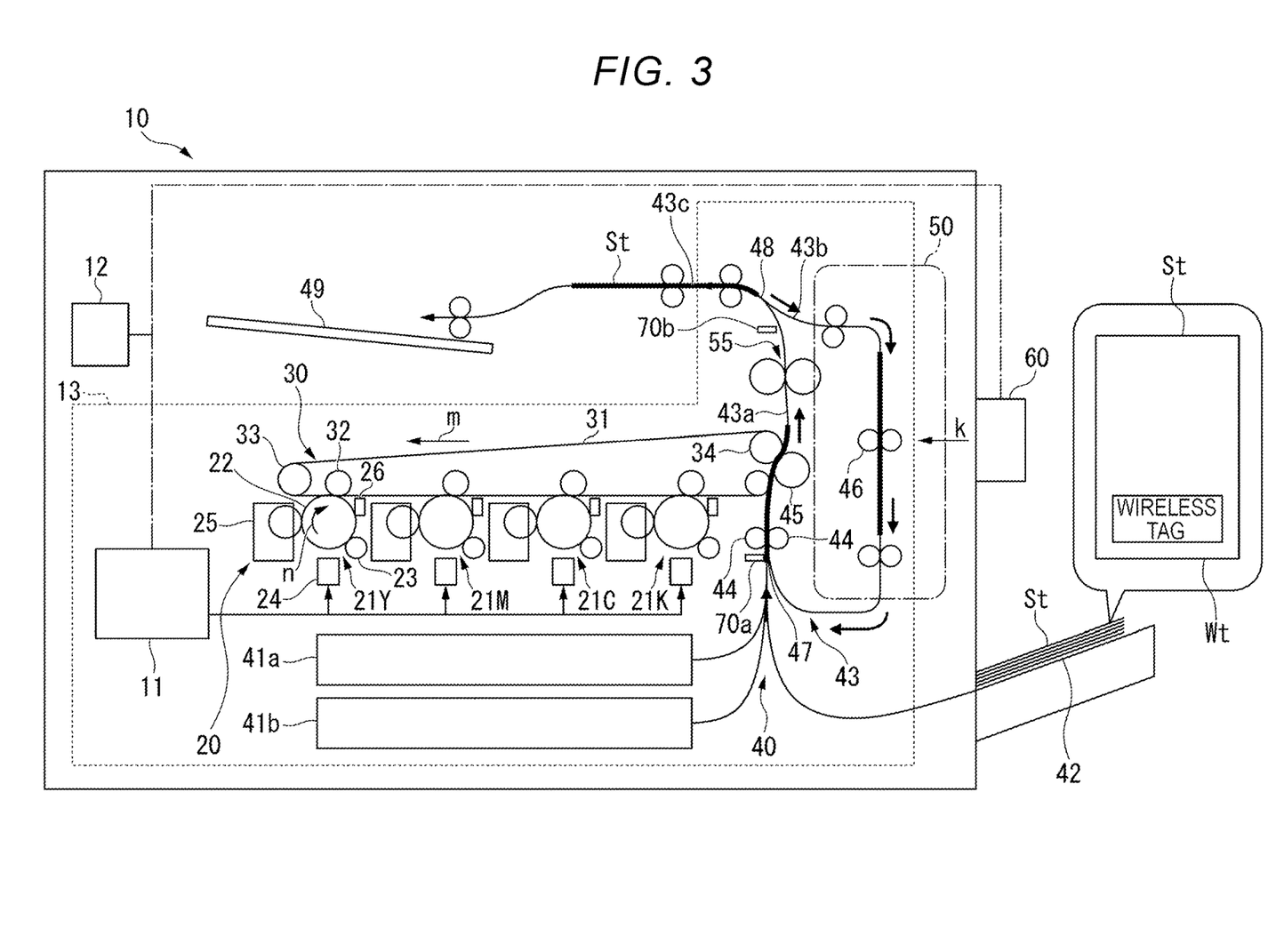
FIG. 3 is a diagram illustrating duplex printing.

FIG. 3 is a diagram illustrating duplex printing performed on the sheet St. In FIG. 3, the sheet St is stored in the feeding tray 42.

The sheet St picked up from the feeding tray 42 is conveyed to the image forming path 43a. Specifically, the sheet St picked up from the feeding tray 42 is sent to the registration roller 44. The sheet St is temporarily stopped by the registration roller 44, so that an inclination of the sheet St is corrected. The sheet St is sent to the secondary transfer roller 45 when a toner image is formed on the intermediate transfer belt 31. In the secondary transfer roller 45, the toner image formed on the intermediate transfer belt 31 is secondarily transferred to the front surface of the sheet St. Thereafter, the sheet St is conveyed to the fixing unit 55. The fixing unit 55 fixes the toner image secondarily transferred to the front surface of the sheet St.

The sheet St in which the image is formed on the front surface is conveyed to the discharging path 43c. Then, the conveyance switching control circuit 208 controls the conveyance path switching unit 207 such that the sheet St is switched back and conveyed to the returning path 43b. Thereafter, the sheet St passes through the returning path 43b and is conveyed to the joining portion 47. Further, the sheet St passes through the registration roller 44 and is conveyed to the image forming path 43a. Thus, the sheet St passing through the returning path 43b is conveyed to the image forming path 43a so that the rear surface of the sheet St faces the intermediate transfer belt 31.

A toner image formed on the intermediate transfer belt 31 is secondarily transferred to the rear surface of the sheet St by the secondary transfer roller 45. Further, the toner image secondarily transferred to the rear surface of the sheet St is fixed by the fixing unit 55. Then, the sheet St in which the toner image is formed on the rear surface passes through the discharging path 43c and is sent to the discharging tray 49.

When the sheet St passes through the image forming path 43a, the reader/writer 210 reads identification information from a wireless tag Wt and writes predetermined information to the wireless tag Wt under the control of the reader/writer control circuit 211.

If an output strength of a signal from the antenna 209 for writing information to the wireless tag Wt is low, the information may not be written to the wireless tag Wt properly. On the other hand, if the output strength is high, information may be written to the wireless tag Wt attached to another sheet St stored in the feeding cassette 41 or the feeding tray 42. Since a metal component or a dielectric substance is disposed inside the image forming apparatus 10, a radio wave condition may become unstable in some cases. Further, the communication with the wireless tag Wt may become unstable depending on a kind of sheet St, a kind of wireless tag Wt, a position at which the wireless tag Wt is disposed on the sheet, or the like. Therefore, writing on the wireless tag Wt may not appropriately be performed.

Accordingly, in the embodiments described herein, the output strength of a radio wave for writing information to the wireless tag Wt is set to an optimum output strength. Hereinafter, a functional configuration of the sheet conveyance device 40 according to an embodiment will be described.

The sheet conveyance device 40 has functions of a communication unit, an adjustment unit, and a determination unit. The function of the communication unit is performed by, for example, the wireless tag communication device 60. The function of the adjustment unit is performed by the processor 201, the conveyance motor control circuit 206, the conveyance switching control circuit 208, the reader/writer control circuit 211, and the sensor control circuit 212. In an embodiment, the processor 201 controls the entire operations of the image forming apparatus 10, and therefore also controls the sheet conveyance device 40. The sheet conveyance device 40 may include a dedicated processor different from the processor 201. The function of the determination unit is performed by the processor 201.

The communication unit can write information to the wireless tag Wt provided on the sheet St when the sheet St is located in the image forming path 43a. Specifically, the communication unit transmits a signal to the wireless tag Wt provided on the sheet St conveyed along the conveyance path 43 (for example, the image forming path 43a) and receives a reflected wave from the wireless tag Wt.

The adjustment unit adjusts an output strength of the signal transmitted to the wireless tag Wt. The adjustment unit includes a conveyance control unit, a transmission control unit, a detection unit, and a setting unit. The function of the conveyance control unit is performed by the processor 201, the conveyance motor control circuit 206, the conveyance switching control circuit 208, and the sensor control circuit 212. The function of the transmission control unit is performed by the processor 201 and the reader/writer control circuit 211. The function of the detection unit is performed by the processor 201 and the sensor control circuit 212. The function of the setting unit is performed by the processor 201 and the reader/writer control circuit 211.

The conveyance control unit conveys the sheet St to the image forming path 43a a plurality of times. In an embodiment, in adjusting the output strength, the sheet St is conveyed along the conveyance path 43 for duplex printing (i.e., the returning path 43b). Therefore, the conveyance control unit conveys the sheet St to the image forming path 43a a plurality of times by controlling the conveyance path switching unit 207 and conveying the sheet St to the returning path 43b.

The transmission control unit controls the reader/writer 210 to transmit a signal via the antenna with an output strength different for each conveyance of the sheet St to the image forming path 43a by the conveyance control unit, via the antenna 209. Specifically, the transmission control unit controls the reader/writer 210 to transmit a signal (a carrier wave: a read command) via the antenna 209 at a given interval (for example, an interval of 10 msec). When the wireless tag Wt receives the signal, the wireless tag Wt generates power and is turned on. Then, the wireless tag Wt transmits a response wave (i.e., the reflected wave) including ID data written in advance. Thus, the antenna 209 is configured to be able to receive the reflected wave from the wireless tag Wt and obtain the ID data of the wireless tag Wt. If the ID data is obtained, the wireless tag communication device 60 can extract recording data corresponding to the ID data and write the extracted recording data to the wireless tag Wt.

Here, the wireless tag Wt transmits the reflected wave with a strength (hereinafter referred to as "the reflection strength") in accordance with the output strength of the signal from the antenna 209. Therefore, the detection unit is configured to detect the reflection strength of the reflected wave. The detection unit detects the reflection strength of the reflected wave for each conveyance of the sheet St to the image forming path 43a by the conveyance control unit. Each reflection strength detected by the detection unit is stored in the memory 202.

The setting unit sets a reference output strength. The reference output strength is an optimum output strength and is specifically an output strength used in subsequent writing of information to the wireless tag Wt. The setting of the reference output strength will be described specifically. The setting unit specifies a minimum reflection strength equal to or greater than a threshold among reflection strengths detected by the detection unit and stored in the memory 202. Further, the setting unit sets the output strength of a radio wave from the antenna 209 corresponding to the specified reflection strength as the reference output strength. Hereinafter, the setting of the reference output strength is referred to as "calibration" in some cases.

An output strength of a signal can be different during a conveyance of a sheet St. For example, the transmission control unit controls the reader/writer 210 to transmit a signal via the antenna 209 with a maximum output strength for a first conveyance of the sheet St to the image forming path 43a. Then, the transmission control unit gradually decreases the output strength for each subsequent conveyance of the sheet St. Until the reflection strength of the response signal becomes less than the threshold, the sheet St is repeatedly conveyed to the image forming path 43a and the output strength is decreased for each conveyance of the sheet St.

If the detection unit detects the reflection strength less than the threshold, the conveyance control unit stops conveying the sheet St to the image forming path 43a. The setting unit specifies the reflection strength detected in the immediately previous conveyance of the sheet St when the reflection strength less than the threshold is detected. The setting unit sets the output strength corresponding to the specified reflection strength as the reference output strength.

An embodiment is not limited to the scenario in which a radio wave is first transmitted with the maximum output strength and is gradually decreased. For example, the radio wave may be first transmitted with a minimum output strength and may be gradually increased. Specifically, the transmission control unit may control the reader/writer 210 to transmit the radio wave with the minimum output strength via the antenna 209 for the first conveyance of the sheet St to the image forming path 43a and may gradually increase the output strength for each subsequent conveyance of the sheet St after the first.

If the detection unit detects the reflection strength equal to or greater than the threshold, the conveyance control unit may stop conveying the sheet St to the image forming path 43a. Further, the setting unit may specify the reflection strength detected in the immediately previous conveyance of the sheet St when the reflection strength equal to or greater than the threshold is detected. The setting unit may set the output strength corresponding to the specified reflection strength as the reference output strength.

Next, a timing at which calibration is performed will be described. In an embodiment, calibration is performed when a different kind of sheet is used. Specifically, the determination unit determines whether the kind of sheet is changed.

Generally, a kind of wireless tag Wt and its reception sensitivity vary depending on a kind of sheet. Therefore, if the kind of sheet is changed, calibration is performed. That is, if the determination unit determines that the kind of sheet is changed, the adjustment unit starts the calibration. Conversely, if the determination unit determines that the kind of sheet is not changed, the adjustment unit does not start the calibration.

The kind of sheet is changed, for example, based on an input operation from the control panel 12 or an operation instruction from another device via the external I/F 203. The timing at which the calibration is performed may not be changed for each kind of sheet St. Specifically, the timing at which the calibration is performed may be a timing at which power is turned on, a timing at which an instruction to start the calibration is received from a user, or a timing at which the sheet St is supplemented.

Next, discharging of the printed sheet St and the sheet St used for the calibration will be described. If the calibration is performed before printing of the sheet St, the image forming apparatus 10 continues to perform printing on the sheet St without stop after the calibration in some cases. The sheet St used for the calibration is discharged to the discharging tray 49. The printed sheet St is also discharged to the discharging tray 49.

Here, if both the sheet St used for the calibration and the printed sheet St are discharged to the discharging tray 49, the sheets St may be mixed. To prevent the mixing, the sheet St used for the calibration and the printed sheet St may be discharged in different manners. For example, if the image forming apparatus 10 includes a single discharging tray 49, each sheet St can be discharged at a different position on the discharging tray 49. The image forming apparatus 10 can also include a plurality of discharging trays 49. If the image forming apparatus 10 includes the plurality of discharging trays 49, each sheet St can also be discharged to a different discharging tray 49.

Figure 4:
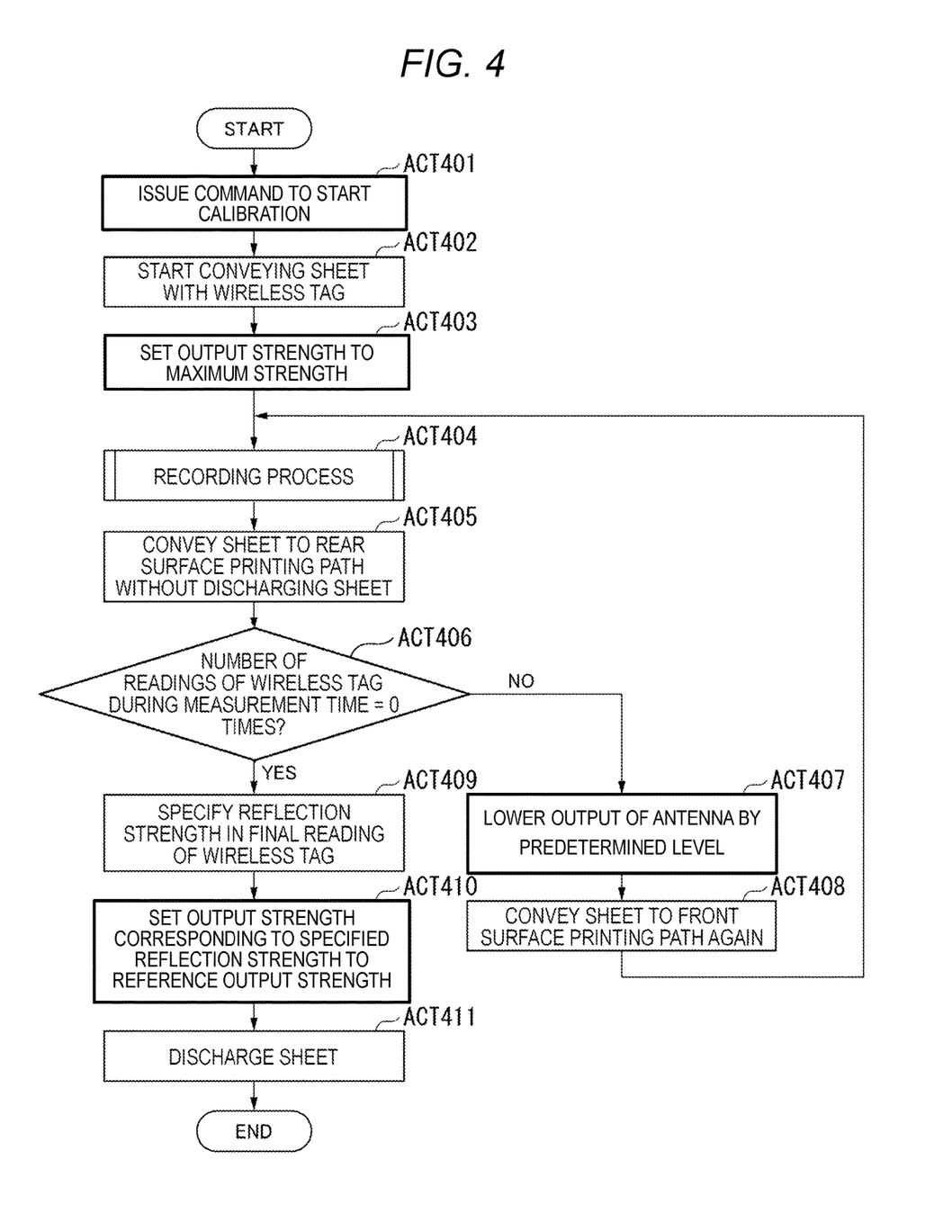
FIG. 4 is a flowchart of a calibration process performed by an image forming apparatus.

Next, a calibration process performed by the image forming apparatus 10 will be described with reference to FIG. 4. In this example, calibration is performed by conveying the sheet St along the conveyance path 43 for duplex printing. FIG. 4 is a flowchart of a calibration process performed by the image forming apparatus 10.

In FIG. 4, the image forming apparatus 10 (i.e., the processor 201) issues a command to start the calibration to each control circuit (i.e., the conveyance motor control circuit 206, the conveyance switching control circuit 208, the reader/writer control circuit 211, and the sensor control circuit 212) (ACT 401). The command to start the calibration is issued, for example, if the kind of sheet being used is changed.

Subsequently, the image forming apparatus 10 starts conveying the sheet St with the wireless tag Wt (ACT 402). Then, the image forming apparatus 10 sets an output strength of a radio wave transmitted from the antenna 209 to the maximum strength (ACT 403). Subsequently, the image forming apparatus 10 performs a reflection strength recording process (ACT 404). Here, the reflection strength recording process will be described in detail with reference to FIG. 5.

Figure 5:
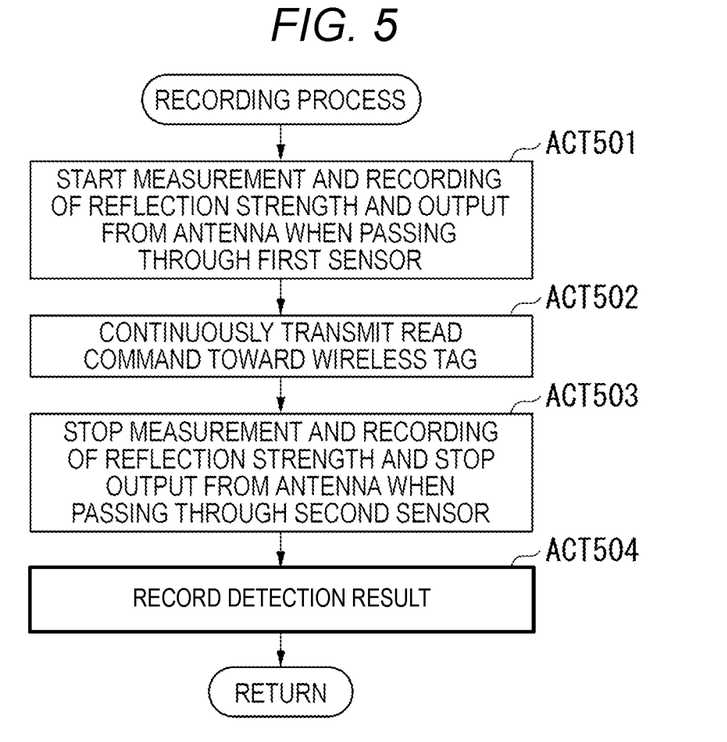
FIG. 5 is a flowchart of a reflection strength recording process.

FIG. 5 is a flowchart of the reflection strength recording process. In FIG. 5, when the sheet St passes through the first sensor 70a, the image forming apparatus 10 starts measurement and recording of output strengths of radio waves transmitted from the antenna 209 and reflection strengths of response waves from the wireless tag Wt (ACT 501). Then, the image forming apparatus 10 continuously issues read commands and transmits radio waves toward the wireless tag Wt of the sheet St (ACT 502).

Subsequently, if the sheet St passes through the second sensor 70b, the image forming apparatus 10 stops the measurement and recording of the reflection strength and the output from the antenna 209 (ACT 503). Then, the image forming apparatus 10 records the recorded strengths as a detection result of a single recording process (ACT 504).

Thereafter, referring back to FIG. 4, the image forming apparatus 10 conveys the sheet St to the returning path 43b which is a rear printing path (ACT 405). Then, the image forming apparatus 10 determines whether the number of readings of the wireless tag Wt in which the reflection strength of the response wave is equal to or greater than the threshold during the recording process is 0 times (ACT 406). If the number of readings of the wireless tag Wt is not 0 times (NO in ACT 406), that is, the number of readings of the wireless tag Wt in which the reflection strength is equal to or greater than the threshold is at least one, the image forming apparatus 10 lowers the output strength of the antenna 209 by a predetermined level (ACT 407).

Then, the image forming apparatus 10 conveys the sheet St to the image forming path 43a which is a front surface printing path (ACT 408) and the process returns to ACT 404. That is, the output strength of the antenna 209 is lowered to perform the recording process again. Conversely, if the number of readings of the wireless tag Wt is 0 times in ACT 406 (YES in ACT 406), that is, the reflection strength is less than the threshold, the image forming apparatus 10 specifies the reflection strength in the final (i.e., immediately previous) reading of the wireless tag Wt (ACT 409). Further, the image forming apparatus 10 sets the output strength corresponding to the specified reflection strength as the reference output strength (ACT 410). Then, the sheet St is discharged to the discharging tray 49 (ACT 411) and the series of processes ends.

By performing the calibration process illustrated in FIG. 4 in advance (i.e., before printing), it is possible to set the output strength of the antenna 209 to the optimum output strength. Thus, it is possible to prevent information from being written to the wireless tag Wt of another sheet St stored in the feeding cassette 41 or the feeding tray 42, and it is also possible to write the information only on the target wireless tag Wt of the sheet St which is being conveyed.

Figure 6:
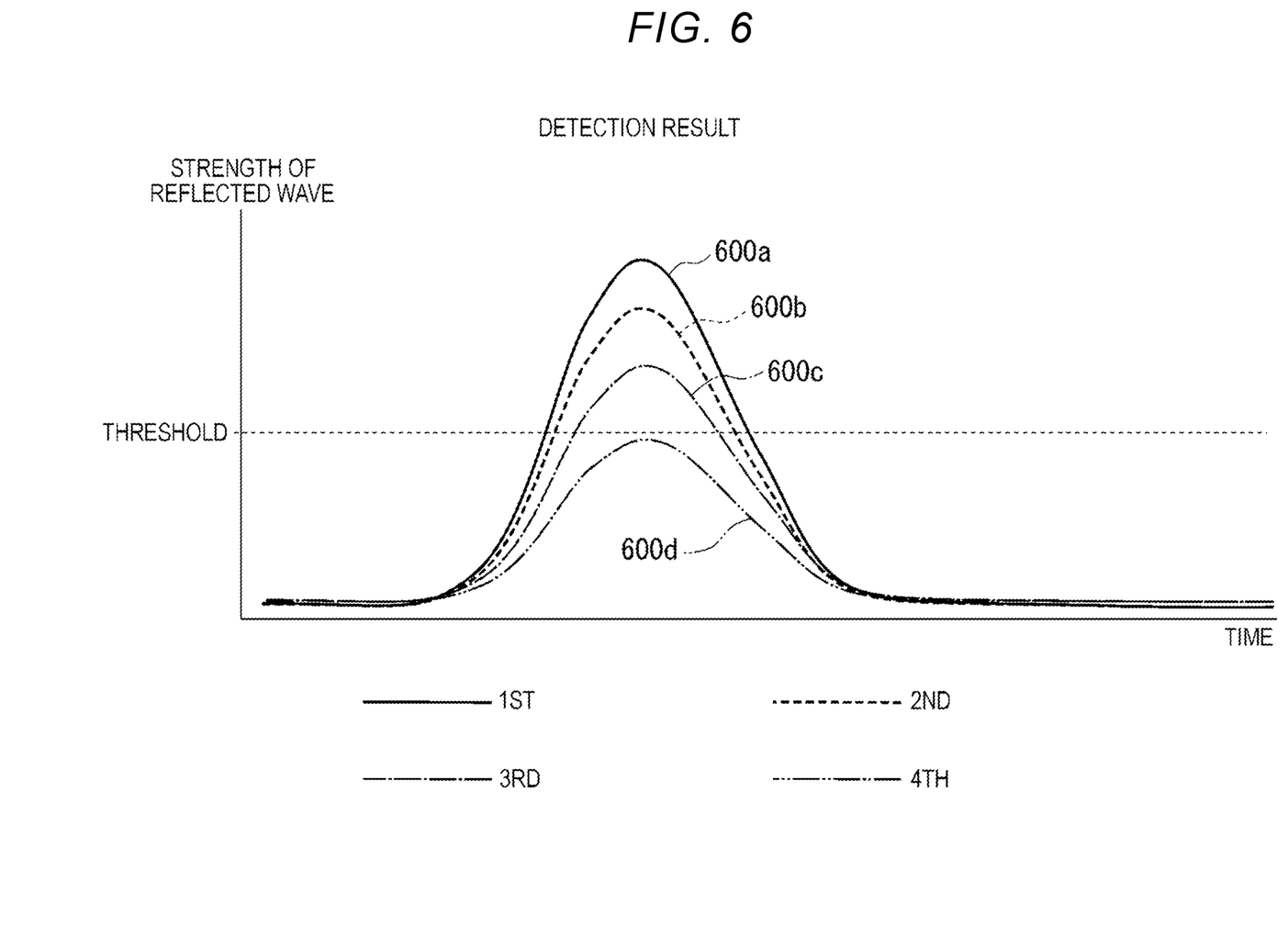
FIG. 6 is a diagram illustrating detection results of the reflection strengths detected in recording processes performed by an image forming apparatus.

Next, detection results of reflection strengths in recording processes of the image forming apparatus 10 will be described with reference to FIG. 6. In the graph illustrated in FIG. 6, the vertical axis represents a reflection strength and the horizontal axis represents a time. The time represented by the horizontal axis is a required time from when the sheet St passes through the first sensor 70a to when the sheet St passes through the second sensor 70b. A detection result 600a indicates a first detection result. A detection result 600b indicates a second detection result. A detection result 600c indicates a third detection result. A detection result 600d indicates a fourth detection result.

The first detection result 600a to the third detection result 600c include the reflection strengths equal to or greater than the threshold. On the other hand, the fourth detection result 600d only includes the reflection strengths less than the threshold. That is, the fourth detection result 600d indicates a level at which it is difficult to write information to the wireless tag Wt. The third detection result 600c indicates a minimum level at which information can be written to the wireless tag Wt. Therefore, the image forming apparatus 10 sets the output strength corresponding to the reflection strengths indicated by the third detection result 600c as the reference output strength.

Here, the image forming apparatus 10 can switch between a normal mode and a cardboard mode in which more time is needed for printing than the normal mode. A sheet with a wireless tag Wt is printed generally in the cardboard mode. Therefore, it may take considerable time to perform the calibration process in the cardboard mode. This is significant especially when the sheet St is circulated in the image forming apparatus 10. Accordingly, in the calibration process, the time can be shortened by conveying the sheet St in the normal mode. A user can select and switch whether to perform the calibration process in the normal mode or the cardboard mode.

As described above, the image forming apparatus 10 (i.e., the sheet conveyance device 40) transmits the radio wave with an output strength different for each conveyance of the sheet St to the image forming path 43a. The image forming apparatus 10 specifies the minimum reflection strength of the response wave from the wireless tag Wt that is equal to or greater than the threshold among the reflection strengths, and sets the output strength corresponding to the specified reflection strength as the reference output strength. Thus, the image forming apparatus 10 can set the optimum output strength of the radio wave for writing information to the wireless tag Wt. Accordingly, the image forming apparatus 10 can appropriately perform the writing on the wireless tag Wt.

In the aforementioned embodiments, the image forming apparatus 10 transmits the radio wave with the maximum output strength in the first conveyance of the sheet St to the image forming path 43a, and gradually reduces the output strength for each conveyance of the sheet St. If the reflection strength less than the threshold is detected, the image forming apparatus 10 specifies the immediately previously detected reflection strength and sets the output strength corresponding to the specified reflection strength as the reference output strength. Thus, the output strength can be set efficiently. Accordingly, it is possible to shorten a time related to the calibration.

In the aforementioned embodiments, the image forming apparatus 10 starts the calibration when the kind of sheet being used is changed. Thus, although reception sensitivity of the wireless tag Wt differs because of the change in the kind of sheet, the output strength for writing information to the wireless tag Wt can be set to the optimum output strength. Accordingly, it is possible to appropriately perform the writing on the wireless tag Wt irrespective of the kind of sheet.

In the aforementioned embodiments, the image forming apparatus 10 conveys the sheet St to the image forming path 43a a plurality of times by conveying the sheet St to the returning path 43b. Thus, the calibration can be performed using one sheet St. Accordingly, it is possible to suppress the number of used sheets St with regard to the calibration as small as possible.

Second Embodiment

Next, a second embodiment will be described. In the above-described first embodiment, the sheet St is conveyed to the image forming path 43a a plurality of times by conveying the sheet St to the returning path 43b. In the second embodiment, a plurality of sheets St is conveyed to the image forming path 43a. In the second embodiment, the same reference numerals are given to portions similar to the portions described in the above-described first embodiment and the duplicated explanations will be omitted as appropriate.

Figure 7:
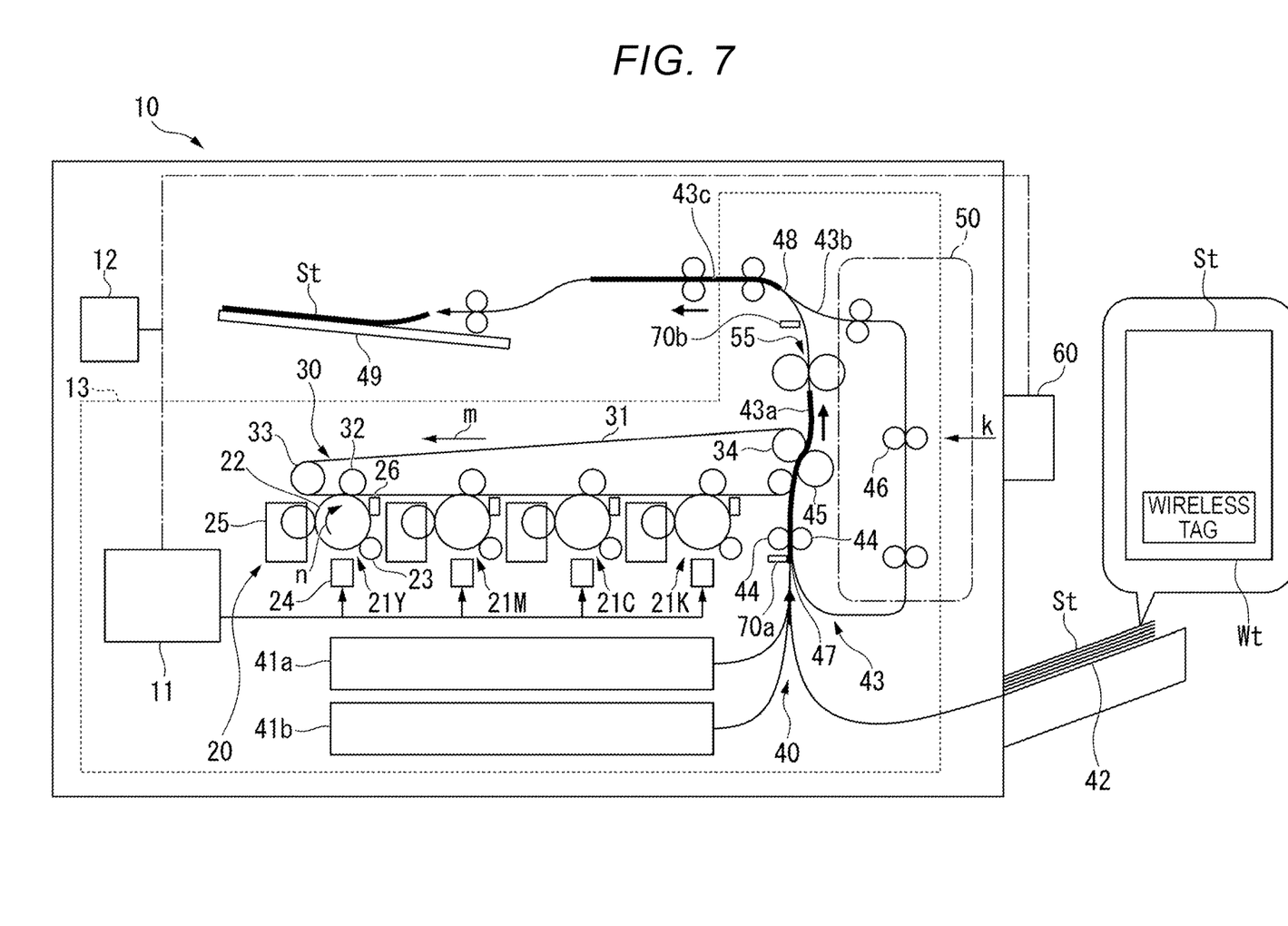
FIG. 7 is a diagram illustrating simplex printing.

First, an operation of the image forming apparatus 10 in simplex printing will be described with reference to FIG. 7. In FIG. 7, the sheet St is stored in the feeding tray 42.

The sheet St picked up from the feeding tray 42 is conveyed to the image forming path 43a. Specifically, the sheet St picked up from the feeding tray 42 is sent to the registration roller 44. The sheet St is temporarily stopped by the registration roller 44, so that an inclination of the sheet St is corrected. The sheet St is sent to the secondary transfer roller 45 when a toner image is formed on the intermediate transfer belt 31. In the secondary transfer roller 45, the toner image formed on the intermediate transfer belt 31 is secondarily transferred to the front surface of the sheet St. Thereafter, the sheet St is conveyed to the fixing unit 55. The fixing unit 55 fixes the toner image secondarily transferred to the front surface of the sheet St.

In the case of simplex printing, the sheet St in which the image is formed on the front surface is entered the discharging path 43c and is sent to the discharging tray 49 as it is. If the sheet St passes through the image forming path 43a, the reader/writer 210 reads identification information from a wireless tag Wt and writes predetermined information to each wireless tag Wt under the control of the reader/writer control circuit 211.

Figure 8:
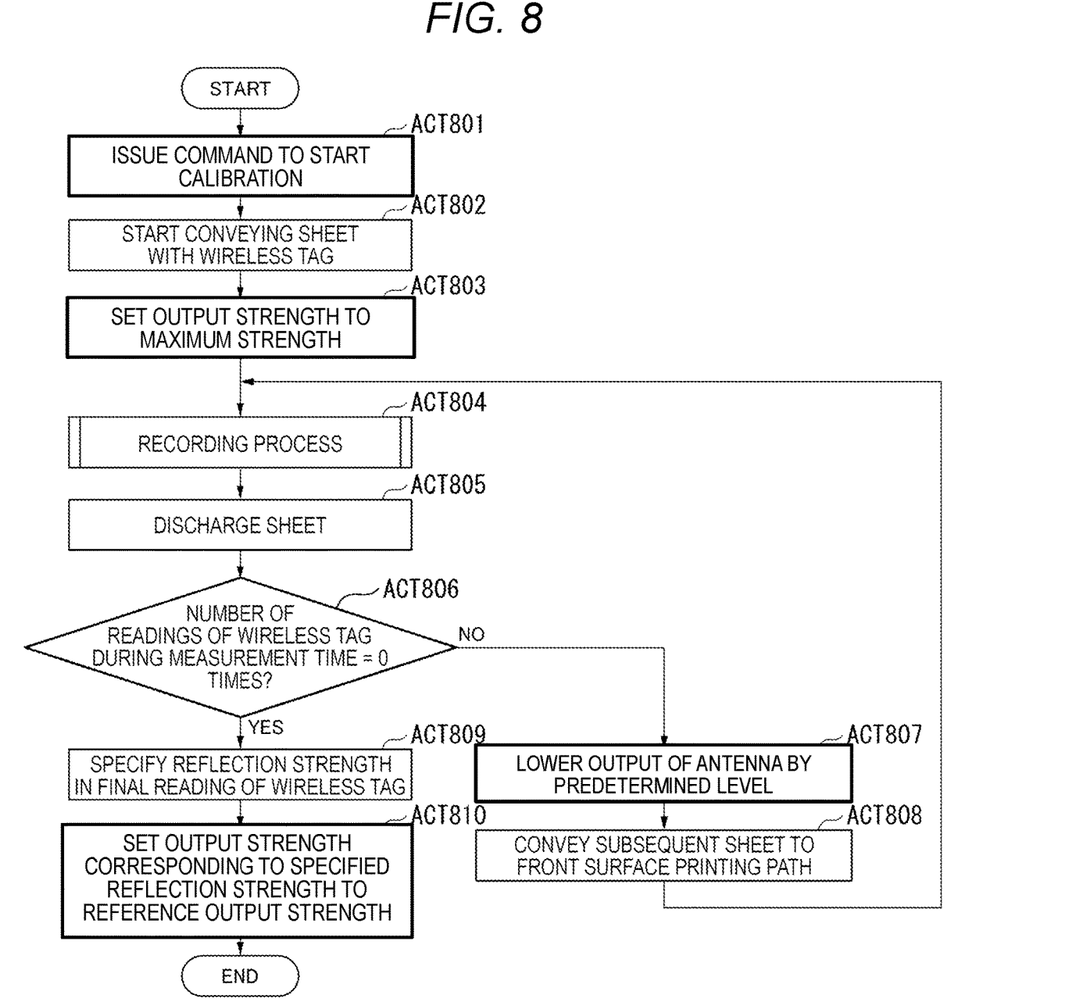
FIG. 8 is a flowchart of a calibration process performed by an image forming apparatus according to a second embodiment.

Next, the calibration process performed by the image forming apparatus 10 will be described with reference to FIG. 8. In the second embodiment, the calibration process is performed by conveying the sheet St along the conveyance path 43 using simplex printing. FIG. 8 is a flowchart of the calibration process performed by the image forming apparatus 10.

In FIG. 8, the image forming apparatus 10 (i.e., the processor 201) issues a command to start the calibration to each control circuit (i.e., the conveyance motor control circuit 206, the conveyance switching control circuit 208, the reader/writer control circuit 211, and the sensor control circuit 212) (ACT 801). The command to start the calibration is issued, for example, if the kind of sheet being used is changed.

Subsequently, the image forming apparatus 10 starts conveying the sheet St with the wireless tag Wt (ACT 802). Then, the image forming apparatus 10 sets an output strength of a radio wave transmitted from the antenna 209 to the maximum strength (ACT 803). Subsequently, the image forming apparatus 10 performs the reflection strength recording process as shown in FIG. 5 (ACT 804).

Thereafter, the image forming apparatus 10 discharges the sheet St to the discharging tray 49 (ACT 805). Then, the image forming apparatus 10 determines whether the number of readings of the wireless tag Wt in which the reflection strength of the response wave is equal to or greater than the threshold during the recording process is 0 times (ACT 806). If the number of readings of the wireless tag Wt is not 0 times (NO in ACT 806), that is, the number of readings of the wireless tag Wt in which the reflection strength is equal to or greater than the threshold is at least one, the image forming apparatus 10 lowers the output strength of the antenna 209 by a predetermined level (ACT 807).

Then, the image forming apparatus 10 conveys the subsequent sheet St to the image forming path 43a which is a front surface printing path (ACT 808) and the process returns to ACT 804. That is, the output strength of the antenna 209 is lowered to perform the recording process again using the subsequent sheet St. Conversely, if the number of readings of the wireless tag Wt is 0 times in ACT 806 (YES in ACT 806), that is, the reflection strength is less than the threshold, the image forming apparatus 10 specifies the reflection strength in the final (i.e., immediately previous) reading of the wireless tag Wt (ACT 809). Further, the image forming apparatus 10 sets the output strength corresponding to the specified reflection strength as the reference output strength (ACT 810) and the series of processes ends.

By performing the calibration process illustrated in FIG. 8 in advance (i.e., before printing), it is possible to set the output strength of the antenna 209 to the optimum output strength. Thus, it is possible to prevent information from being written to the wireless tag Wt of another sheet St stored in the feeding cassette 41 or the feeding tray 42, and it is also possible to write the information only on the target wireless tag Wt of the sheet St which is being conveyed.

Figure 9:
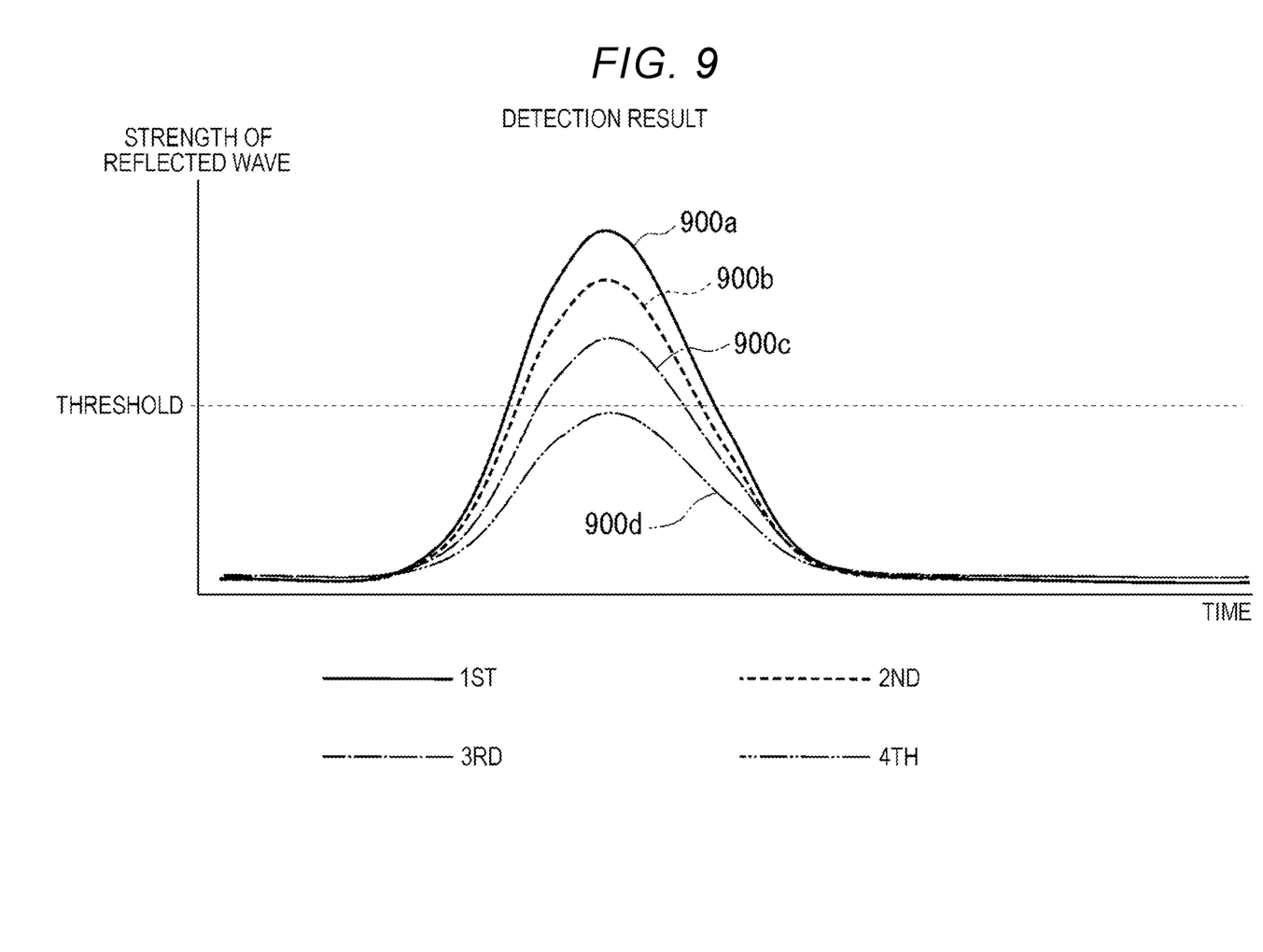
FIG. 9 is a diagram illustrating strengths of reflected waves detected in a writing process performed by an image forming apparatus according to a second embodiment.

Next, detection results of reflection strengths detected in the second embodiment will be described with reference to FIG. 9. In the graph illustrated in FIG. 9, the vertical axis represents a reflection strength and the horizontal axis represents a time. The time represented by the horizontal axis is a required time from when the sheet St passes through the first sensor 70a to when the sheet St passes through the second sensor 70b. A detection result 900a indicates a first detection result. A detection result 900b indicates a second detection result. A detection result 900c indicates a third detection result. A detection result 900d indicates a fourth detection result.

The first detection result 900a to the third detection result 900c include the reflection strengths equal to or greater than the threshold. On the other hand, the fourth detection result 900d only includes the reflection strength less than the threshold. That is, the fourth detection result 900d indicates a level at which it is difficult to write information to the wireless tag Wt. The third detection result 900c indicates a minimum level at which information can be written to the wireless tag Wt. Therefore, the image forming apparatus 10 sets the output strength corresponding to the reflection strength indicated by the third detection result 900c as the reference output strength.

As described above, the image forming apparatus 10 (i.e., the sheet conveyance device 40) also specifies the minimum reflection strength of the response wave from the wireless tag Wt that is equal to or greater than the threshold among the reflection strengths, and sets the output strength corresponding to the specified reflection strength as the reference output strength. Thus, the image forming apparatus 10 can set the optimum output strength of the radio wave for writing information to the wireless tag Wt. Accordingly, the image forming apparatus 10 can appropriately perform the writing on the wireless tag Wt.

In the second embodiment, a plurality of sheets St is conveyed to the image forming path 43a. Thus, since a conveyance direction of each sheet St is not switched, the calibration can be performed through a simple process. Since the conveyance direction of the sheet St is not switched, sheet jamming caused due to the switching of the conveyance direction can be avoided.

The functions of the sheet conveyance device 40 according to the above-described embodiments may be performed by a computer system including one or more computers. In such a case, one or more programs for performing the functions may be recorded on a computer-readable recording medium and installed to the computer system. The "computer system" mentioned here includes an operating system (OS) or hardware such as peripheral devices. The "computer-readable recording medium" is a portable medium such as a flexible disc, a magneto-optical disc, a ROM, or a CD-ROM or a memory device such as a hard disk in the computer system. Further, the "computer-readable recording medium" may include a medium that retains the program temporarily in a short or given time, such as a communication line if the programs are transmitted via a communication network such as a telephone line or a network such as the Internet, a volatile memory inside a computer serving as a server or a client. Some or all of the above-described functions may be performed by the programs, and such programs may be installed in the computer system in advance.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet conveyance device, comprising:
 a conveyance roller by which a sheet having a wireless tag is conveyed along a conveyance path;
 a communication device configured to transmit a radio signal to the wireless tag and receive a response signal therefrom; and
 a processor configured to:
  repeatedly perform a process of:
   controlling the roller to convey a sheet along the conveyance path while controlling the communication device to transmit the radio signal to a wireless tag of the sheet using a transmission power that is different in each repeat, and
   acquire a strength of the response signal from the wireless tag, and
  specify a minimum strength of the response signal that has been acquired in the repeated process, the minimum strength being equal to or greater than a threshold, and
  set a transmission power that has been used when the minimum strength has been acquired as a reference strength of the radio signal.

2. The sheet conveyance device according to claim 1, wherein
 the transmission power of the radio signal is decreased as the process is repeated, and
 the processor is further configured to:
  at an end of each repeat of the process, determine whether the strength of the response signal is smaller than the threshold, and
  upon determining that the strength of the response signal is smaller than the threshold, set a transmission power that has been used in the last repeat as the reference strength.

3. The sheet conveyance device according to claim 2, wherein a maximum transmission power is used to transmit the radio signal in a first repeat of the process.

4. The sheet conveyance device according to claim 1, wherein
 the processor is further configured to determine whether a type of the sheet is changed, and
 the process is performed when the type of the sheet is changed.

5. The sheet conveyance device according to claim 1, wherein the conveyance path includes a first path in which the radio signal is transmitted to the wireless tag and a second path along which the sheet is conveyed back to a beginning of the first path, and the processor is further configured to, after each repeat of the process, control the roller to convey the sheet back to the beginning of the first path through the second path.

6. The sheet conveyance device according to claim 5, wherein a single sheet is used in the repeated process.

7. The sheet conveyance device according to claim 1, wherein a different sheet is used to acquire the strength of the response signal in each repeat.

8. The sheet conveyance device according to claim 1, further comprising:

a printer unit configured to form an image on the sheet when the sheet is conveyed along the conveyance path.

9. The sheet conveyance device according to claim 8, wherein the processor is further configured to control the communication device to write information to the wireless tag when the sheet is conveyed.

10. The sheet conveyance device according to claim 1, further comprising:

a housing in which the conveyance roller and the processor are disposed and on which the communication device is attached.

11. A method for calibrating a sheet conveyance device, the method comprising:

repeatedly performing a process of:

conveying a sheet having a wireless tag along a conveyance path while transmitting a radio signal to the wireless tag using a transmission power that is different in each repeat, and acquiring a strength of a response signal from the wireless tag;

specifying a minimum strength of the response signal that has been acquired in the repeated process, the minimum strength being equal to or greater than a threshold; and setting a transmission power that has been used when the minimum strength has been acquired as a reference strength of the radio signal.

12. The method according to claim 11, wherein the transmission power of the radio signal is decreased as the process is repeated, and the method further comprises:

at an end of each repeat of the process, determining whether the strength of the response signal is smaller than the threshold, and upon determining that the strength of the response signal is smaller than the threshold, setting a transmission power that has been used in the last repeat as the reference strength.

13. The method according to claim 12, wherein a maximum transmission power is used to transmit the radio signal in a first repeat of the process.

14. The method according to claim 11, further comprising:

determining whether a type of the sheet is changed, wherein the process is performed when the type of the sheet is changed.

15. The method according to claim 11, wherein the conveyance path includes a first path in which the radio signal is transmitted to the wireless tag and a second path along which the sheet is conveyed back to a beginning of the first path, and after each repeat of the process, the sheet is conveyed back to the beginning of the first path through the second path.

16. The method according to claim 15, wherein a single sheet is used in the repeated process.

17. The method according to claim 11, wherein a different sheet is used to acquire the strength of the response signal in each repeat.

18. The method according to claim 11, further comprising:

forming an image on the sheet when the sheet is conveyed along the conveyance path.

19. The method according to claim 18, further comprising:

writing information to the wireless tag when the sheet is conveyed.

20. A non-transitory computer readable medium storing a program causing a sheet conveyance device to perform a method of:

repeatedly performing a process of:

conveying a sheet having a wireless tag along a conveyance path while transmitting a radio signal to the wireless tag using a transmission power that is different in each repeat, and acquiring a strength of a response signal from the wireless tag;

specifying a minimum strength of the response signal that has been acquired in the repeated process, the minimum strength being equal to or greater than a threshold; and setting a transmission power that has been used when the minimum strength has been acquired as a reference strength of the radio signal.

* * * * *